United States Patent Office 3,454,546
Patented July 8, 1969

3,454,546
PROCESS FOR ISOPRENE POLYMERIZATION AND POLYISOPRENE COMPOSITIONS
Charles H. Wilcoxen, Jr., San Lorenzo, Calif., assignor to Shell Oil Company, New York, N.Y., a corporation of Delaware
No Drawing. Filed Oct. 10, 1966, Ser. No. 585,280
Int. Cl. C08d 1/20, 3/12
U.S. Cl. 260—94.2                    4 Claims

ABSTRACT OF THE DISCLOSURE

A process is provided for forming a polyisoprene exhibiting improved tack and other improved physical properties comprising solution polymerization with an alkyl lithium in the presence of the reaction product of alkyl lithium and water.

---

This invention is directed to an improved process for the polymerization of isoprene. More particularly, the invention is directed to an improved polymerization system, an improved polyisoprene and improved vulcanized products of the polymers so obtained.

The polymerization of conjugated dienes for the production of synthetic rubbers has been developed extensively in the recent past. One of the principal objectives has been to obtain a polymeric product having all of the beneficial properties of natural rubber (i.e. high cis 1,4-content) and at the same time a product in which the less desirable properties of natural rubber (odor, proteins, etc.) are either absent or are minimized. Many catalysts systems have been examined with these interrelated objectives in view. It has been found that the polymerization conditions for isoprene may differ substantially from those required for the production of suitable polybutadienes. Moreover, it has been well established that the conditions found to be optimum for the polymerization of either of these monomers bear little relationship to the polymerization conditions required for the production of polymers of monoolefins or of polystyrene and the like. This may in part be due to the possibility of producing polymers having a high cis 1,4-content as opposed to polymers having a random type of polymerization in which the cis 1,4-content is substantially lower with concomitant formation of the trans 1,4-isomer or of 1,2- isomers. These latter configurations have been found to produce polymeric materials having, for most purposes, less desirable properties as vulcanized elastomers even though they may be useful for the formation of certain rubber cement products.

The large majority of natural rubber differs from substantially all of the synthetic polymers in having essentially 100% cis 1,4-configuration. Moreover, the natural product contains certain non-rubber constituents and is also known to contain a certain proportion of gel which is understood to be cross-linking between polymeric chains. Each of the desirable fundamental characteristics of the natural product may be approached but in most cases not achieved by the synthetic materials or by the polymerization systems known at the present time.

Among the many complicated requirements for the utilization of rubbers, one of the most demanding with respect to the physical properties of the product is found in the tire building industry. Tires may be considered as being composed of two principal components, one being carcass and the other being the tread. The carcass is normally composed of rubber, reinforcing fillers such as carbon blacks, vulcanizing agents and fibers or fabrics which may be rayon, nylon, steel, cotton or glass fibers. Tread stocks differ from these in their proportion of reinforcing fillers and in the usual absence of a fabric or fiber. It is necessary in the construction of a tire that the unvulcanized composition be adhesive at least to the extent that the tire can be built up layer by layer. The tread stock must adhere to the carcass stock firmly enough to support its own weight and tolerate a certain degree of necessary storage during the manufacturing process between the time the unvulcanized components are assembled and the tire is placed in the vulcanizing mold. It has been found that many synthetic polyisoprenes are deficient in this important property, which is referred to as "building tack." The reason for this is obscure but means have been investigated for improving the property with only a limited degree of success in this respect.

It is an object of the present invention to improve the process for the polymerization of isoprene. It is a particular object of the invention to provide a process for the production of polyisoprene having improved building tack. A further object of the invention is to provide a process for the production of polyisoprene having both improved building tack and high temperature tensile strength. Related objects include the production of reinforced polyisoprene compositions wherein the polyisoprene has been obtained at least in part in the process of this invention. Other objects will become apparent during the following detailed description of the invention.

Now in accordance with the present invention, a polymerization system has been discovered for the production of polyisoprene showing not only improved building tack but also increased high temperature tensile strength. The discovery involves the utilization of a hydrocarbon polymerization system for polyisoprene wherein the lithium alkyl catalyst is modified by the reaction product of water with a portion of lithium alkyl based on the active catalyst remaining. Still in accordance with the present invention, improved polyisoprene compositions are provided comprising unvulcanized polyisoprene produced in the above described polymerization system, a carbon black and vulcanizing agents with or without rubber extending oils and other extenders or fillers.

The precise role and exact chemical nature of water and its reaction products with lithium alkyl have not been determined. It is postulated, without meaning to limit the invetnion in this respect, that water reacts with lithium alkyl to form lithium hydroxide in the first place, which reaction is supposed to occur with substantial rapidity. Lithium hydroxide is then believed to be capable of reacting at a slower rate with further proportions of lithium alkyl to form lithium oxide. However, the precise nature of these reactions does not form a part of the present invention. All that has been established is that the addition of water to a polymerization system containing lithium alkyl forms a superior polymerization system in that the polymer produced therein has substantially improved structure (cis 1,4-content) and building tack and exhibits increased high temperature tensile strength.

While water may be introduced by a number of alternative procedures the preferred procedure is as follows:

A hydrocarbon solution of isoprene is introduced into a reactor and the contents are then "titrated" with a sufficient amount of lithium alkyl to react with undesirable impurities in the system to the point of incipient polymerization of the isoprene. At this point water may be introduced into the system preferably in the form of a solution, e.g., (benzene) which is miscible with the hydrocarbon-isoprene mixture. An amount of lithium alkyl is then introduced which is at least sufficient to form a reaction product with the added water. Thereafter, if an amount of lithium alkyl necessary for polymerization of isoprene was not introduced in the latter step, then further quantities of a lithium alkyl are introduced and polymerization is thereby initiated.

Other means for introducing water are also contemplated such as incremental addition of water throughout the course of the polymerization either continuously or in stages. Furthermore, the water may be added as such and will then consume a portion of the lithium alkyl present in the system or it may first be reacted with lithium alkyl to form the reaction products which are believed to be created by contacting these two components. The proportions of water to alkyl may be expressed in several ways: Preferably, an amount of water is introduced into the system in an amount sufficient to react with between about 20 mol percent and 60 mol percent of the total lithium alkyl utilized throughout the course of the polymerization. Expressed in another manner, it is preferred that the amount of water injected into the system be between about 0.3 mol and about 0.9 mol per mol of active lithium alkyl catalyst, that is, the amount of lithium alkyl catalyst in excess of that required for reaction with water and therefore free for performing its primary function of catalyzing the polymerization of isoprene. A further expression, based on the theory of reaction of water discussed above, is that the polymerization is conducted in the presence of 0.1–0.6 mol of lithium oxide or hydroxide per mol of lithium alkyl.

The amount of active catalyst utilized for the polymerization of isoprene will depend in large part upon the intrinsic viscosity (average molecular weight) of the polymer which is desired. Normally, this will be at least about $1 \times 10^{-5}$ mols per mol of isoprene, but the precise ratio does not form an essential aspect of the present invention.

The hydrocarbons in which polymerization of isoprene may occur usually comprise alpha-olefins or alkanes including cycloalkanes although aromatic hydrocarbons may be used if desired. Suitable species of hydrocarbon forming the essential bulk of the polymerization mixture include pentanes, and especially branched pentanes, pentenes and especially mixtures of pentenes, cyclohexanes, cyclopentane, benzene and mixtures of these. Cyclohexane is an especially preferred polymerization medium since it has been found to promote high cis 1,4-content in the polymeric product.

Polymerization may be conducted under known conditions insofar as temperature, time, agitation and other conditions are concerned. Suitable time and temperature include reaction periods between about 30 and about 300 minutes at temperatures between about 25 and about 75° C. The polymerized product of the reaction may be recovered by suitable means, preferably by coagulation with steam under conditions of high shear to flash off the volatile solvent and convert the polymer into the form of small crumbs which are dropped into a hot water bath. The water is eventually drained off and the recovered crumb is converted into a dry form by subjecting it to drying conditions such as in an oven through which it is passed on a moving belt.

The major benefits of polymerization in the presence of water or its reaction products with lithium alkyl are encountered during utilization of the elastomer, particularly prior to its vulcanization but also subsequent thereto. The major benefit gained is in the substantially improved building tack noted when the polymer is utilized in conjunction with reinforcing fillers, such as carbon blacks, which are normally employed in proportions between about 25 and 100 parts by weight per 100 parts by weight of the elastomer. The compounds so formed may be further extended by the use of inert fillers and rubber extending oils which are usually either aromatic or naphthenic petroleum oils from which relative volatile constituents have been removed. It is noted that the polyisoprenes prepared in accordance with the process of the invention exhibit substantially improved building tack, presenting a relatively adhesive surface on which further components of a product during manufacture such as a tire or tire carcass may be readily applied and to which they adhere. This is to be compared with polyisoprenes prepared with alkyl lithium catalyst but in the absence of any water or reaction products thereof with lithium alkyls. In the latter prior art process, the polyisoprene compositions are relatively "dry" and have poor building tack. Moreover, one of the striking advantages gained by the present invention is in the improvement of high temperature tensile strength as will be seen by the comparative data to be given in the working examples presented hereinafter.

Example I

Twenty kilos of a 10% by weight solution of isoprene in cyclohexane were charged to a reactor, heated to 80° C. and 30 cc. of the mixture distilled off to purge the reactor of oxygen and moisture. The solvent and monomer mixture was then titrated to a point of incipient polymerization with lithium secondary butyl to remove objectionable impurities. After this, water was dissolved in benzene and added to the mixture. An equi-molar amount of secondary butyl lithium was added to react with the water and in addition 5 parts per million based on the weight of entire reaction mixture of active lithium secondary butyl as the polymerization catalyst. The mixture then contained the reaction product of water with secondary butyl lithium, the amount of water originally added being about 0.53 mol per mol of active lithium catalyst. Based on the total lithium alkyl addition, the amount of water was 0.105 mol per mol of total lithium alkyl. Polymerization was conducted at 50° C. for about 240 minutes and the polymer recovered by coagulation with steam and dried in hot air. The product was found to have over 96% cis 1,4-content and intrinsic viscosity of 8.57. It had a crystallization half time of about 22 days. Compared with this, the typical polyisoprene prepared under essentially identical conditions but in the absence of any added water had a cis content in the order of 88% and a crystallization half time in excess of 90 days.

In order to determine the building tack quality of the polyisoprene prepared in the presence of water or its reaction products as compared with polyisoprene prepared in the absence of water, tread and carcass stocks were compounded using the following recipes.

TABLE I

| Ingredient: | Tread | Carcass |
| --- | --- | --- |
| Polymer | 100 | 100 |
| Phenyl-beta-naphthylamine | 1 | 1 |
| Zinc oxide | 5 | 3 |
| Stearic acid | 3 | 3 |
| Residual petroleum rubber extending oil | 5 | |
| HAF black | 50 | |
| FEF black | | 30 |
| N-oxydiethylene benzothiazole-2-sulfenamide | 0.8 | |
| N-cyclohexyl-2-benzothiazole sulfenamide | | 0.4 |
| Reaction product of ethyl chloride, formaldehyde and ammonia | | 0.3 |
| Sulfur | 2.0 | 2.25 |

The unvulcanized tread and carcass stocks containing the polyisoprene prepared according to the process of the present invention were found to have excellent building tack as compared with the relatively poor building tack of similar compositions prepared by using polyisoprene synthesized in the absence of water. The compositions were vulcanized using a 45 minute cure at 145° C. Table II shows comparative data obtained on vulcanizates of the tread stocks.

TABLE II

| | Prior art polyisoprene | Polyisoprene of this invention |
|---|---|---|
| Stress-Strain Properties, 23° C.[1]: | | |
| Tensile strength, p.s.i. | 3,810 | 3,985 |
| 300% modulus, p.s.i. | 1,275 | 1,810 |
| Set, percent | 20 | 22 |
| Shore A hardness | 57 | 58 |
| Stress-strain properties, 100°C.[2]: | | |
| Tensile strength, p.s.i. | 2,785 | 3,140 |
| 300% modulus, p.s.i. | 800 | 1,150 |
| Elongation, percent | 700 | 675 |
| Set, percent | 20 | 25 |

[1] Die D specimens.
[2] Short Die D specimens used because of limited crosshead travel.

The same comparison was made between vulcanizates of the several carcass stock compositions, after vulcanizing for 30 minutes at 145° C.

TABLE III

| | Prior art polyisoprene | Polyisoprene of this invention |
|---|---|---|
| Stress-Strain Properties, 23° C.[1]: | | |
| Tensile strength, p.s.i. | 1,070 | 4,070 |
| 300% modulus, p.s.i. | 1,280 | 1,350 |
| Elongation, percent | 610 | 580 |
| Set, percent | 30 | 30 |
| Shore A hardness | 46 | 54 |
| Stress-Strain Properties, 100° C.[2]: | | |
| Tensile strength, p.s.i. | 2,260 | 2,750 |
| 300% modulus, p.s.i. | 740 | 720 |
| Elongation, percent | 675 | 775 |
| Set, percent | 25 | 25 |

[1] Die D specimens.
[2] Short Die D specimens used because of limited crosshead travel.

It will be noted that the modulus and tensile strength of the compositions prepared in accordance with the process of this invention were clearly superior to those obtained from compositions prepared with prior art polyisoprenes wherein no water was present during polymerization of the latter.

I claim as my invention:

1. In a process for the polymerization of isoprene wherein isoprene is polymerized in $C_{5-6}$ hydrocarbon solution in the presence of a lithium butyl catalyst, the improvement comprising conducting the polymerization in the presence of 0.1 to 0.6 mol per mol of lithium butyl catalyst as the sole metallo-organic catalyst, of a reaction product of water with lithium butyl.

2. A process according to claim 1 wherein the lithium-butyl is a lithium secondary butyl.

3. A process according to claim 1 wherein the hydrocarbon is a cycloalkane.

4. In a process for the polymerization of isoprene, wherein isoprene is polymerized in cyclohexane solution in the presence of sec-butyl lithium catalyst as the sole metallo-organic catalyst, the improvement comprising conducting the polymerization in the presence of a mixture of the catalyst and a reaction product of the catalyst with water, the amount of water being sufficient to react with between about 20 mol percent and 60 mol percent of the total lithium alkyl utilized throughout the course of the polymerization.

References Cited

UNITED STATES PATENTS 3,245,945   4/1966   Anderson et al.
3,329,666   7/1967   Stearns.

MORRIS LIEBMAN, *Primary Examiner.*

H. H. FLETCHER, *Assistant Examiner.*

U.S. Cl. X.R.

252—430; 260—33.6, 41.5